(12) United States Patent
Sakhnini et al.

(10) Patent No.: US 11,916,608 B2
(45) Date of Patent: Feb. 27, 2024

(54) WAVEFORM PARAMETERS ADAPTATION

(71) Applicant: QUALCOMM Incorporated, San Diego, CA (US)

(72) Inventors: Iyab Issam Sakhnini, San Diego, CA (US); Tao Luo, San Diego, CA (US); Xiaoxia Zhang, San Diego, CA (US); Jun Ma, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 17/361,697

(22) Filed: Jun. 29, 2021

(65) Prior Publication Data

US 2022/0416916 A1    Dec. 29, 2022

(51) Int. Cl.
*H04B 17/29* (2015.01)

(52) U.S. Cl.
CPC .................... *H04B 17/29* (2015.01)

(58) Field of Classification Search
CPC ...................................... H04B 17/29
See application file for complete search history.

(56) References Cited

U.S. PATENT DOCUMENTS

| | | | | |
|---|---|---|---|---|
| 6,286,104 B1 * | 9/2001 | Buhle | .................. | H04L 63/105 |
| | | | | 707/999.009 |
| 8,548,097 B1 * | 10/2013 | Eliaz | ................. | H04L 25/03949 |
| | | | | 708/319 |
| 2007/0002986 A1 * | 1/2007 | Green | ................. | H04L 25/4917 |
| | | | | 375/353 |
| 2012/0170525 A1 * | 7/2012 | Sorrentino | ............ | H04L 5/0051 |
| | | | | 370/329 |
| 2016/0262167 A1 | 9/2016 | Lan et al. | | |
| 2019/0059078 A1 | 2/2019 | Noh et al. | | |
| 2019/0254020 A1 * | 8/2019 | Nam | ...................... | H04L 5/0051 |
| 2020/0021412 A1 * | 1/2020 | Xu | ........................ | H04L 1/0021 |

FOREIGN PATENT DOCUMENTS

WO      2021084333 A1      5/2021

OTHER PUBLICATIONS

International Search Report and Written Opinion—PCT/US2022/072052—ISA/EPO—dated Aug. 16, 2022.
Qualcomm Incorporated: "PDSCH and PUSCH Enhancements for 52.6-71GHz Band", R1-2101457, 3GPP TSG-RAN WG1 #104-e, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021, XP051971622, 11 Pages, Section 2.2.1.

* cited by examiner

*Primary Examiner* — Hsinchun Liao
(74) *Attorney, Agent, or Firm* — Patterson & Sheridan LLP

(57) ABSTRACT

Certain aspects of the present disclosure provide techniques for waveform parameters adaptation. Aspects provide for adapting waveforms to account for impairments that can occur when communicating in a high frequency band. A method that may be performed by a base station (BS) includes detecting one or more impairment conditions. The method includes determining a plurality of waveform parameters to adapt in response to the detected one or more impairment conditions. The method includes signaling the plurality of adapted waveform parameters to a user equipment (UE).

28 Claims, 9 Drawing Sheets

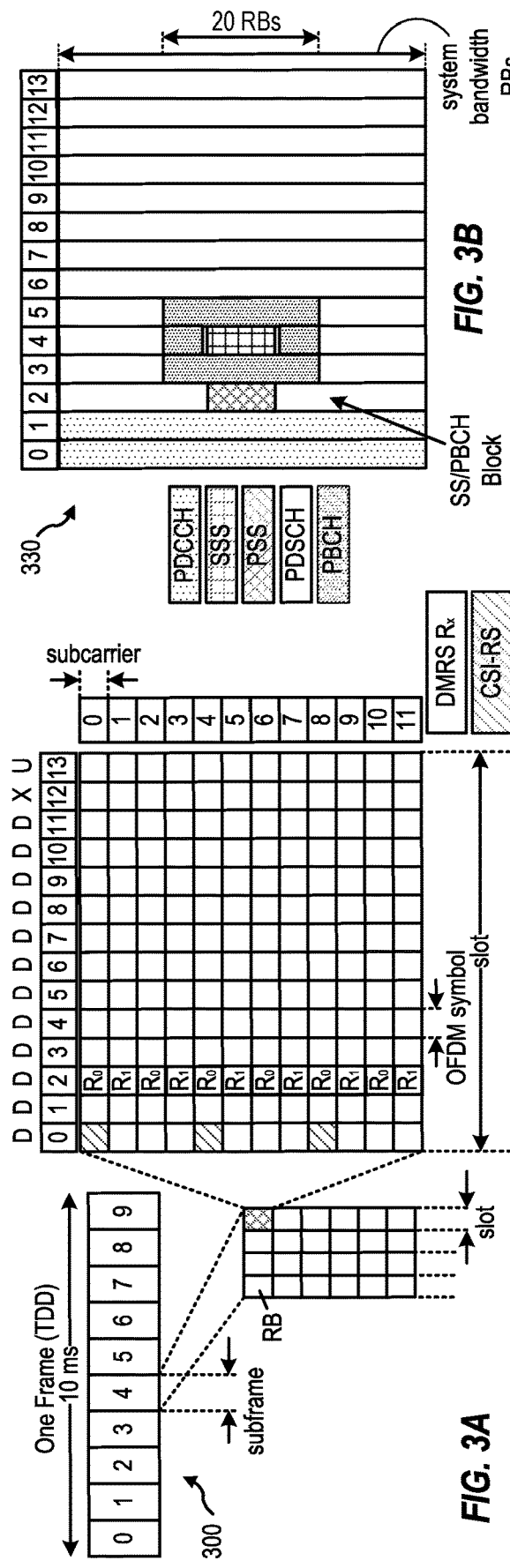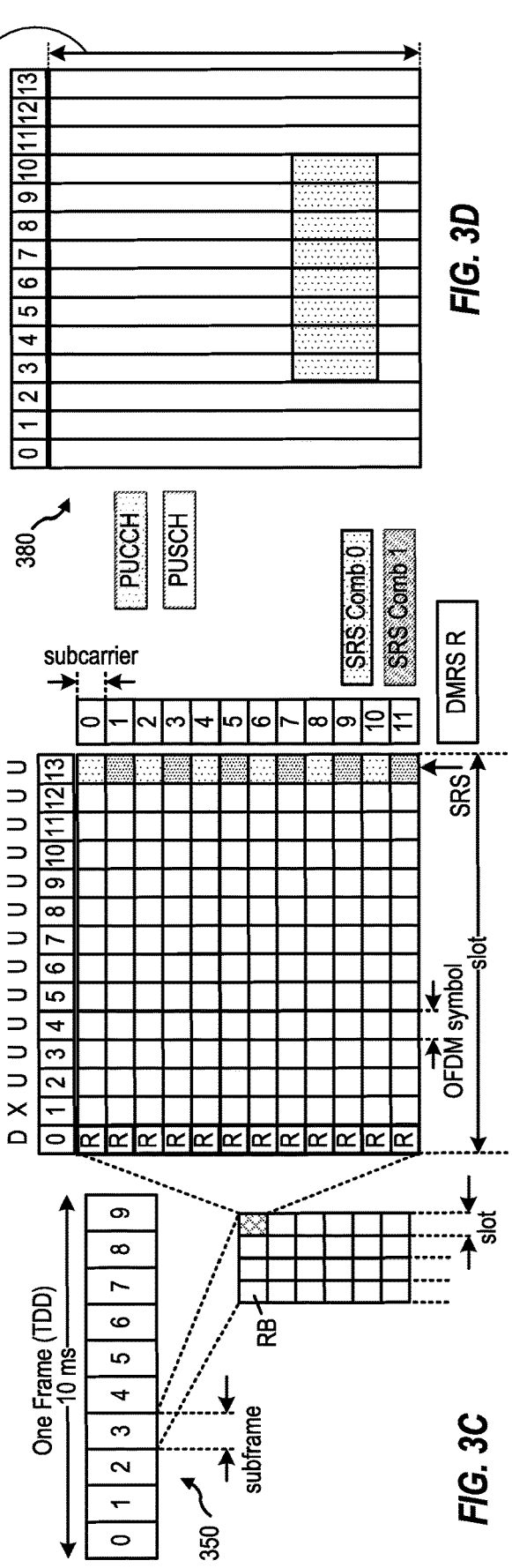

WAVEFORM PARAMETERS ADAPTATION

BACKGROUND

Field of the Disclosure

Aspects of the present disclosure relate to wireless communications, and more particularly, to techniques for waveform parameters adaptation.

Description of Related Art

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few.

These and other multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

Certain aspects of the subject matter described in this disclosure can be implemented in a method for wireless communication by a base station (BS). The method generally includes detecting one or more impairment conditions. The method generally includes determining a plurality of waveform parameters to adapt in response to the detected one or more impairment conditions. The method generally includes signaling the plurality of adapted waveform parameters to a user equipment (UE).

Certain aspects of the subject matter described in this disclosure can be implemented in a method for wireless communication by a UE. The method generally includes detecting one or more impairment conditions. The method generally includes providing assistance information to a BS based on the detected one or more impairment conditions. The method generally includes receiving signaling of a plurality of adapted waveform parameters from the BS, in response to the assistance information.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

FIGS. 3A-3D depict various example aspects of data structures for a wireless communication network), in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for waveform parameters adaptation.

Impairments may be encounter in wireless communications. Such impairments may include peak-to-average power ratio (PAPR) reduction, increased phase noise, and increased receiver complexity. Such impairments may be encounter in new radio (NR) systems, such as when devices are communicating in higher frequency bands and with certain waveforms. In addition, at different, devices may have different capabilities to handle such impairments.

Accordingly, aspects of the present disclosure provide techniques and apparatus for waveform parameters adaptation. Multiple different waveform parameters, such as the waveform type itself, a modulation scheme, a subcarrier spacing (SCS), and other parameters can be adapted to address an impairment issue. According to certain aspects, different combinations of waveform parameters can be adapted to address different impairments. In addition, the adapted waveform parameters may be dependent on capabilities of a user equipment (UE), loading conditions, input from the UE, measurements, and the like. According to certain aspects, a user equipment (UE) can provide assistance information to a base station (BS) for the waveform parameter adaptation. In some examples, the UE includes requested waveform parameters to adapt in the assistance information. In some examples, the UE includes measurements, UE capabilities, and/or other information in the assistance information.

Example Wireless Communication Network

Figure 1:
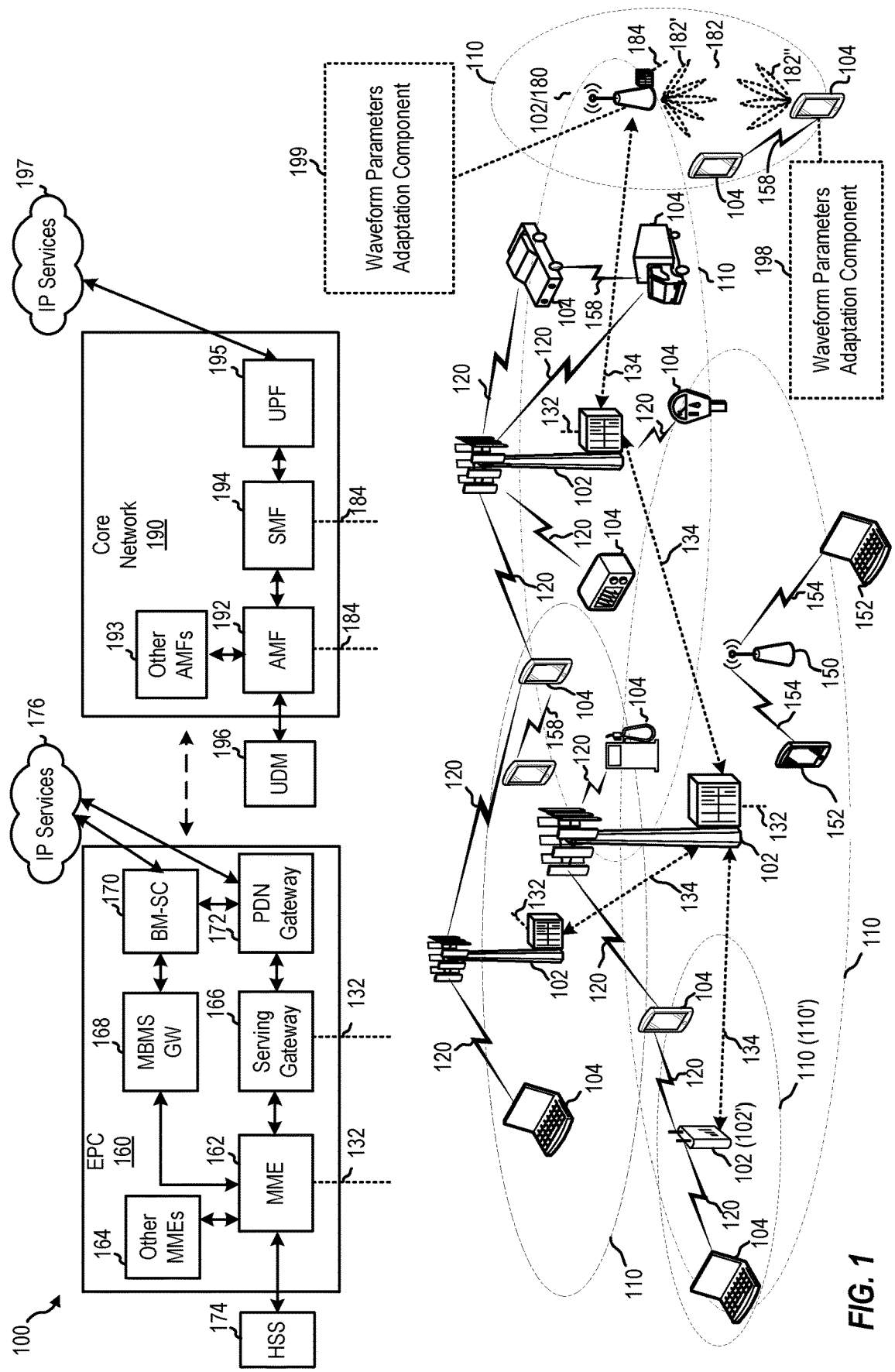
FIG. 1 is a block diagram conceptually illustrating an example wireless communication network, in accordance with certain aspects of the present disclosure.

FIG. 1 depicts an example of a wireless communications network 100, in which aspects described herein may be implemented. The wireless communication network 100 may be a new radio (NR) network (e.g., a 5G NR network).

Generally, wireless communications network 100 includes base stations (BSs) 102, user equipments (UEs) 104, an Evolved Packet Core (EPC) 160, and core network 190 (e.g., a 5G Core (5GC)), which interoperate to provide wireless communications services.

BSs 102 may provide an access point to the EPC 160 and/or to the core network 190 for a user equipment 104. The BSs 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. BSs 102 may include and/or be referred to as a next generation Node B (gNB), a Node B, an evolved Node B (eNB), an access point (AP), a base transceiver station (BTS), a radio base station, a radio transceiver, a transceiver function, or a transmit reception point (TRP) in various contexts.

BSs 102 wirelessly communicate with UEs 104 via communications links 120. Each of the BSs 102 may provide communication coverage for a respective geographic coverage area 110, which may overlap in some cases. For example, small cell 102' (e.g., a low-power BS) may have a coverage area 110' that overlaps the coverage area 110 of one or more macrocells (e.g., high-power BSs).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system (GPS), a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal (MT), a wireless terminal, a remote terminal, a handset, a user agent, a mobile client, or a client.

According to certain aspects, the BSs 102 and UEs 104 may be configured for waveform parameters adaptation. As shown in FIG. 1, the BS 102 includes a waveform parameters adaptation component 199 that may be configured to dynamically adapt waveform parameters for higher band impairments management, in accordance with aspects of the present disclosure. The UE 120a includes a waveform parameters adaptation component 198 that may be configured to dynamically adapt waveform parameters for higher band impairments management, in accordance with aspects of the present disclosure.

Figure 2:
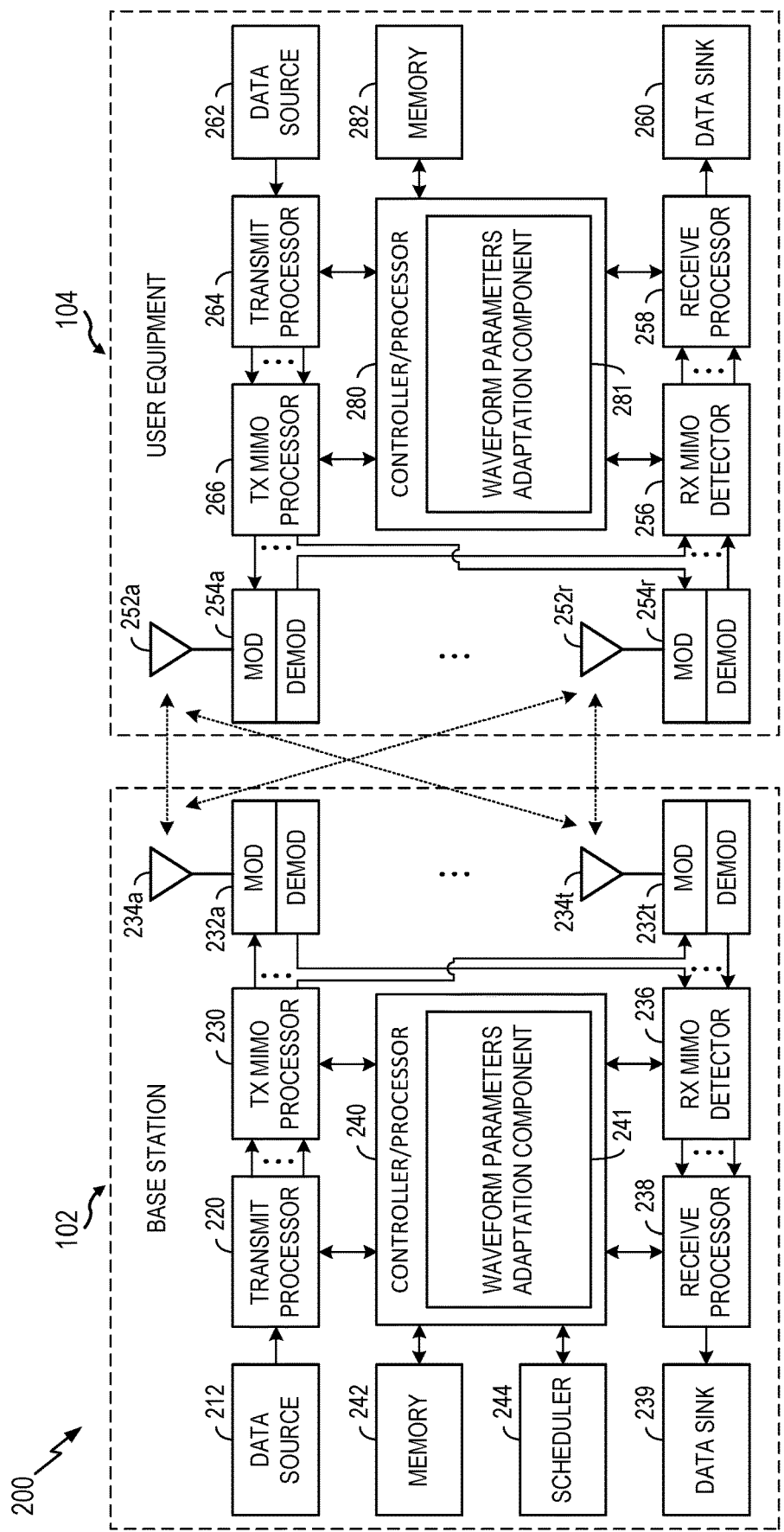
FIG. 2 is a block diagram conceptually illustrating aspects of an example base station (BS) and user equipment (UE), in accordance with certain aspects of the present disclosure.

FIG. 2 depicts aspects of an example BS 102 and UE 104.

Generally, BS 102 includes various processors (e.g., 220, 230, 238, and 240), antennas 234a-t (collectively 234), transceivers 232a-t (collectively 232) which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes waveform parameters adaptation component 241, which may be representative of waveform parameters adaptation component 199 of FIG. 1. Notably, while depicted as an aspect of controller/processor 240, waveform parameters adaptation component 241 may be implemented additionally or alternatively in various other aspects of BS 102 in other implementations.

Generally, UE 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., source data 262) and wireless reception of data (e.g., data sink 260).

UE 102 includes controller/processor 280, which may be configured to implement various functions related to wireless communications. In the depicted example, controller/processor 280 includes waveform parameters adaptation component 281, which may be representative of waveform parameters adaptation component 198 of FIG. 1. Notably, while depicted as an aspect of controller/processor 280, waveform parameters adaptation component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

In wireless communications, an electromagnetic spectrum is often subdivided, into various classes, bands, channels, or other features. The subdivision is often provided based on wavelength and frequency, where frequency may also be referred to as a carrier, a subcarrier, a frequency channel, a tone, or a subband.

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" ("mmW" or "mmWave") band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmWave/near mmWave radio frequency band (e.g., 3 GHz-300 GHz) may have higher path loss and a shorter range compared to lower frequency communications. Accordingly, in FIG. 1, BS 180 may utilize beamforming 182 with the UE 104 to improve path loss and range. To do so, BS 180 and the UE 104 may each include a plurality of antennas, such as antenna elements, antenna panels, and/or antenna arrays to facilitate the beamforming.

In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

In new radio systems (e.g., 5G NR), UEs and BSs may operate in higher frequency bands, such as FR2 and beyond (e.g., bands greater than 52.6 GHz). Operation in the higher bands may allow for communications with larger bandwidth and higher throughput. Operations in the higher band may, however, suffer from one or more impairments. In one example, operations in the higher bands may experience a higher phase noise (PN). In another example, operations in the higher bands may target a lower peak-to-average power ratio (PAPR). In yet another example, operations in the higher bands may lead to increased receiver complexity.

Phase noise is a random local oscillator (LO) frequency offset causing mismatch between the LO of transmitter and the LO of the receiver. At higher carrier frequencies (higher bands), phase noise increases. Phase noise robustness may also depend on whether coherent or non-coherent modulation is used. An example coherent modulation scheme is quadrature amplitude modulation (QAM). Examples of non-coherent modulation schemes includes phase shift keying (PSK), differential phase shift keying (DPSK), frequency shift keying (FSK), and amplitude shift keying (ASK).

Figure 4:
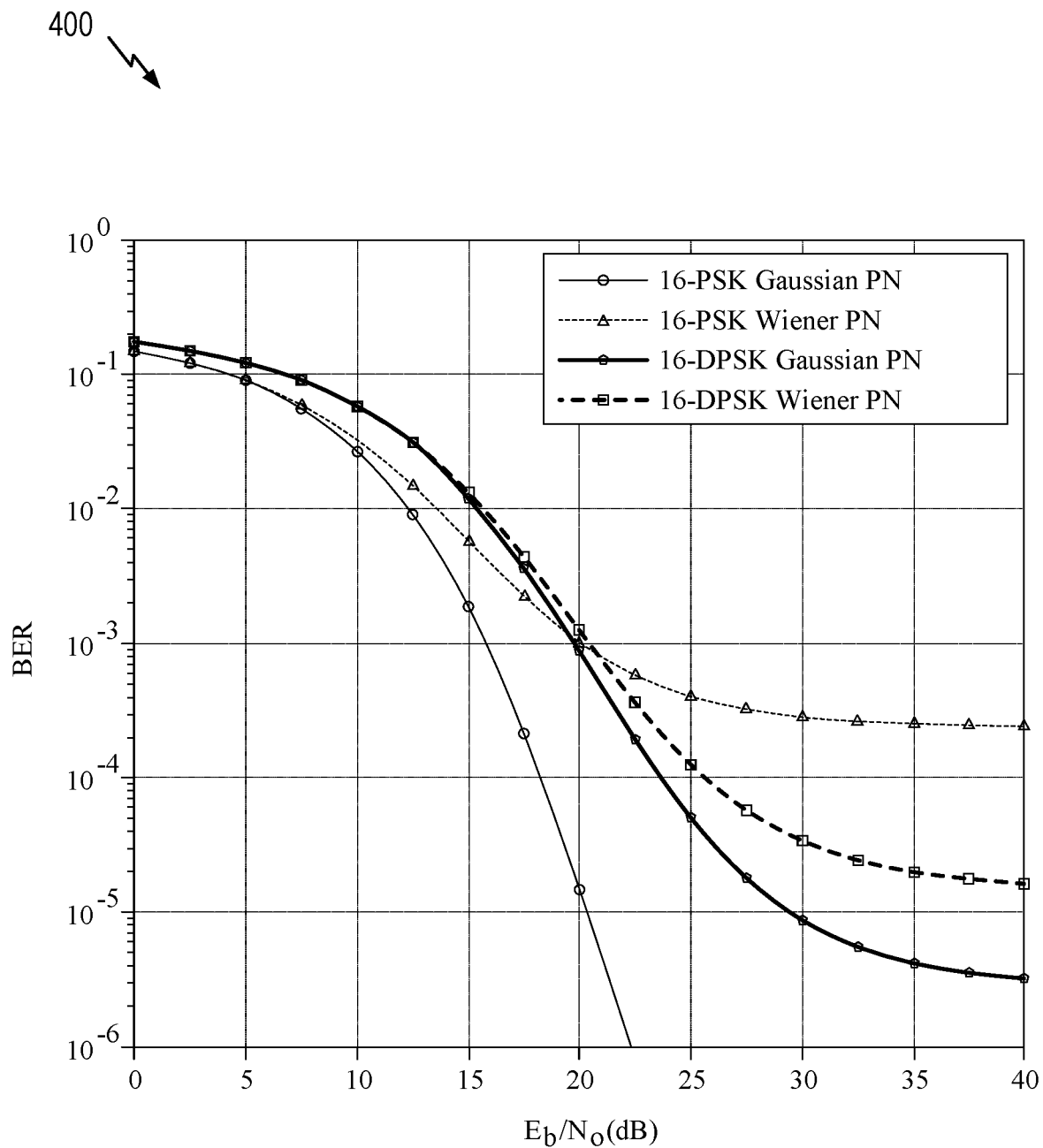
FIG. 4 is a graph illustrating example performance of various modulation schemes.

Non-coherent modulation schemes are generally more robust to phase noise errors and, therefore, estimation of carrier phase noise may not be done. Coherent modulation schemes are generally less robust to phase noise. Non-coherent modulation schemes, however, may exhibit higher block error rates (BER) than may only occur under low/medium PN assumptions. At high phase noise and signal to noise ratios (SNR), non-coherent modulation schemes may outperform coherent schemes, as shown in FIG. 4. FIG. 4 is a graph 400 illustrating example performance of various modulation schemes. As shown in graph 400, BLER generally decreases as the energy per bit ($E_b$) to spectral noise density ratio ($N_0$) increases.

Receiver complexity may increase based on the type of waveform used. For example, if an OFDM waveform or a discrete Fourier transform (DFT) spread OFDM (DFT-s-OFDM) waveform is used, a larger subcarrier spacing (SCS), thereby increasing receiver complexity (e.g., fast Fourier transform operation may be an issue).

A single cell time division scheme may impede the ability to perform frequency division multiplexing (FDM) and lower the bandwidth utilization and efficiency. The receiver can use a single tap frequency domain equalizer (FDE) or may use a time domain equalizer. With FDE, the receiver may use a cyclic prefix (CP) or guard interval (GI). With FDE, FFT may be used at the receiver, which increases complexity at the receiver.

In addition, at different times, the receiver may have different processing loads and, thus, is able to handle different complexity configurations. Different loading may be due to scheduling activity, a number of configured MIMO layers, beam management, and the like.

Various waveforms may be used in higher operation bands. These waveforms can include CP-OFDM, a SC frequency duplexed waveform such as SC-DFT-s-OFDM, and a SC time duplexed waveform such as SC-QAM.

A CP-OFDM waveform uses a CP. CP-OFDM may have high complexity. CP-OFDM may use a single tap FDE. CP-OFDM makes efficient use of the bandwidth. FDM can be used with CP-OFDM. CP-OFDM may use an increased SCS. CP-OFDM may use a higher order MIMO scheme.

A SC FD waveform uses a CP or GI. The SC FD waveform may have high complexity. The SC FD waveform may use a single tap FDE. The SC FD waveform makes efficient use of the bandwidth. FDM can be used with the SC FD waveform, however, PAPR may be impacted. SC FD may use an increased SCS.

A SC TD waveform uses a CP or GI. The SC TD waveform may have lower complexity than the SC FD and CP-OFDM waveforms. The SC TD waveform may use a single tap FDE or TDE. The SC FD waveform makes less efficient use of the bandwidth than the SC FD and CP-OFDM waveforms. FDM can be used with the SC FD waveform with guard bands. SC TD may perform well at lower SNRs. SC TD may use TD filtering.

Accordingly, what is needed are techniques and apparatus for waveform parameters adaptation.

Example Waveform Parameters Adaptation

Aspects of the present disclosure provide for waveform parameters adaptation. The waveform parameters adaptation may be dynamic. The waveform parameters adaptation may be based on, or in response to, one or more impairment conditions. Aspects provide for dynamic higher band impairment management. Aspects provide for user equipment (UE) requested complexity reduction for higher bands. Aspects provide for UE-assisted modulation scheme selection for phase noise reduction.

Figure 5:
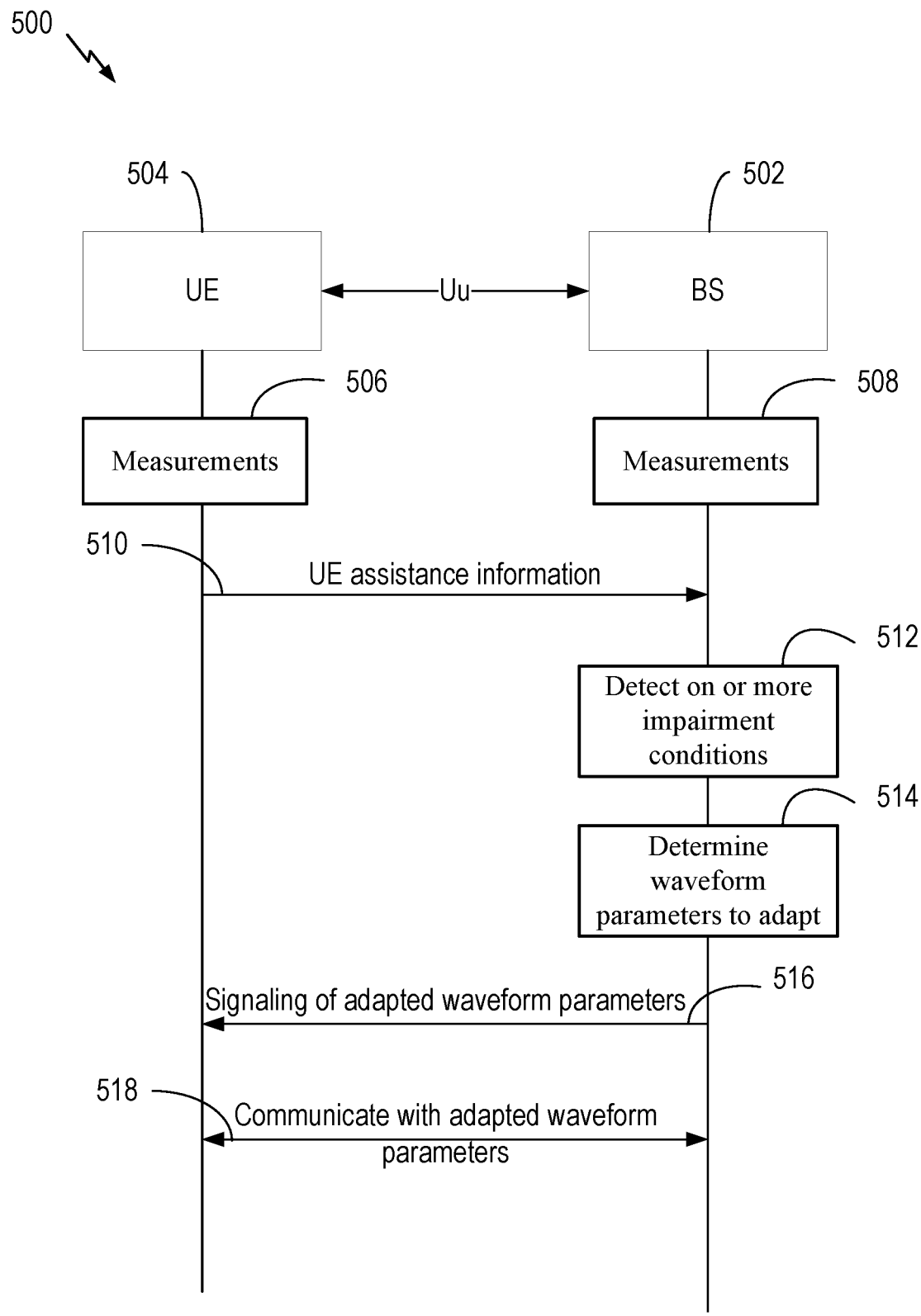
FIG. 5 is a call flow diagram illustrating example signaling for waveform parameters adaptation, in accordance with aspects of the present disclosure.

FIG. 5 is a call flow diagram illustrating example operations 500 for waveform parameters adaptation, in accordance with aspects of the present disclosure. Aspects of the present disclosure may be understood with respect to FIG. 5 and are discussed in more detail below. As shown in FIG. 5, a base station (BS) 502 (e.g., which may be a BS 102 in wireless communication network 100) communicates with a UE 504. BS 502 and UE 504 may communicate via a uU cellular access link.

Operations 500 may include BS 502 performing measurements at 508. Operations 500 may include UE 504 performing measurements at 506. The measurements may be channel measurements (e.g., and/or channel estimations), such as signal quality measurements. The measurements may be used to detect one or more impairments conditions at 512. For example, BS 502 can detect the one or more impairments conditions, at 512, based on the BS measurements (at 508) and/or the UE measurements (at 506). The UE measurements (e.g., signal-to-noise (SNR) measurements, phase noise measurements, block error rate (BLER) measurements, power headroom measurements, peak-to-average power ratio (PAPR), and/or other measurements) may be reported to BS 502 in UE assistance information at 510.

The assistance information, at 510, from UE 504 to BS 502 may be determined based on measurements by UE 504. The assistance information may assist BS 502 in determining to adapt waveform parameters.

According to certain aspects, the assistance information, at 510, from UE 504 to BS 502 includes one or more requested or recommended waveform parameters to adapt. For example, UE 504 could recommend a maximum SCS for a certain waveform type. The assistance information, at 510, may explicitly indicated the requested or recommended waveform parameters. Although not shown in FIG. 5, BS 502 may configure (e.g., signal dynamically or semi-statically) UE 504 with one or more rules (e.g., metrics, criteria, trigger, thresholds, etc.) for UE 504 to report a combination of requested or recommended waveform parameters. Additionally or alternatively, the rules may be specified, such as in a 3GPP wireless standard and/or up to UE implementation.

The assistance information, at 510, may implicitly indicate waveform parameters to adapt. For example, combinations of waveform parameters to adapt may be mapped to a configuration of the uplink message (e.g., a PUCCH resource or PRACH sequence used for the UL transmission may indicate a combination of waveform parameters to adapt). The assistance information may include measurement results done by the UE. In an example, the assistance information may include a channel quality indicator (CQI) that maps to a modulation scheme. In another example, the wireless standards may define a CQI/MCS table with different modulation schemes and the assistance information may indicate a CQI/MCS table selection. In another example, the assistance information may indicate a recommend/selected modulation scheme that implicitly indicates a phase tracking reference signal (PTRS) configuration. In another example, the assistance information reports UE complexity information, such as loading, that BS 502 may use to determine the one or more waveform parameters to adapt.

According to certain aspects, the assistance information, at 510, may be provided by UE 504 for uplink only, for downlink only, for both uplink and downlink, per-channel, per multiple-input multiple-output (MIMO) layer, per beam, per transmission configuration indicator (TCI) state, per-subband, per-antenna panel, and/or per-group of antenna panels.

According to certain aspects, UE 504 transmits the assistance information periodically, aperiodically, and/or event-based. For aperiodic transmission, the network may trigger assistance information using downlink control information (DCI) signaling or medium access control control element (MAC-CE) signaling. For event-based, UE 504 may send assistance information on preconfigured resource when a preconfigured condition occurs.

UE 504 may transmit the assistance information, at 510, on a physical uplink control channel (PUCCH), a physical uplink shared channel (PUSCH), or both. UE 504 may transmit the assistance information, at 510, in the channel standalone, without other transmissions, or multiplex with in the channel. For example, the assistance information may be multiplexed in the channel with a channel state information (CSI) report.

At 514, BS 502 determines waveform parameters to adapt. BS 502 may dynamically adapt the waveform parameters. The waveform parameters may be determined based on the detected one or more impairments (at 512) and/or the UE assistance information (at 510). In some examples, BS 502 determines to adapt the waveform parameters requested by UE 504). The combination of waveform parameters to adapt may be referred to as an impairment reduction configuration.

As discussed above, operations in higher bands may lead to increased phase noise. In some examples, the one or more impairments detected by BS 502, at 512, include phase noise. In this example, the one or more waveform parameters to adapt, determined at 514, may be to reduce phase noise. For example, BS 502 may determine, at 514, to adapt to a larger subcarrier spacing (SCS), a wider bandwidth, a different waveform type (e.g., to a single-carrier waveform), a receiver phase noise mitigation technique, a non-coherent modulation for higher phase noise (e.g., phase noise at or above a PN threshold) and/or SNR (e.g., an SNR at or above a threshold SNR), a coherent modulation for lower phase noise (e.g., PN below the PN threshold) and/or SNR (e.g., SNR below the SNR threshold), a reduce modulation coding scheme (MCS), a delay spread, and/or a phase tracking reference signal (PTRS) to help the receiver estimate and compensate for phase noise.

A coherent modulation scheme may include quadrature amplitude modulation (QAM). Non-coherent modulation schemes may include differential phase shift keying (DPSK), frequency shift keying (FSK), amplitude shift keying (ASK), and the like.

PTRS may be dense in time and sparse in frequency. PTRS may be sent only if a demodulation reference signal (DMRS) is sent. PTRS may be uplink and/or downlink. PTRS may be CP-OFDM or DFT-s-OFDM based. The time density may be a function of the MCS. The frequency density may be a function of a bandwidth of a bandwidth part (BWP).

Although examples discussed herein relate to increased phase noise and waveform parameters adaptation to decrease the phase noise, when the phase noise is low, waveform parameters may be adapted to relax the phase noise mitigation. Although examples are described with respect to certain example parameters to reduce the phase noise, any of the waveform parameters described herein and/or other parameters may be adapted to reduce the phase noise.

As discussed above, operations in higher bands may lead to increased receiver complexity (e.g., increased UE complexity). In some examples, the one or more impairments detected by BS 502, at 512, include receiver complexity. In this example, the one or more waveform parameters to adapt, determined at 514, may be to reduce receiver complexity. The receiver complexity may be reduced to a complexity the receiver can support. For example, BS 502 may determine, at 514, to adapt to a different waveform type, whether or not filtering is used, to a frequency domain equalizer (FDE) (e.g., versus a time domain equalizer (TDE)), a different SCS, a lower maximum number of MIMO layers, a different bandwidth (e.g., a narrower bandwidth), and/or relaxed timing requirements. The relaxed timing requirements may include a relaxed timing requirement between a downlink control information (DCI) with a grant and the granted physical downlink shared channel (PDSCH) or physical uplink shared channel (PUSCH), between a PDSCH and a physical uplink control channel (PUCCH) carrying an hybrid automatic repeat request (HARQ) acknowledgment (ACK) feedback for the PDSCH, between a DCI trigger aperiodic channel state information reference signal (CSI-RS) transmission, between a DCI trigger aperiodic sounding reference signal (SRS) transmission, and/or a between a DCI with a TCI update and the TCI state application. In some examples, UE 504 requests, in the assistance information, the one or more waveform parameters to adapt based on the UEs internal assessment of complexity. The UE complexity may include a level of UE processor utilization.

Although examples discussed herein relate to reduced receiver complexity and waveform parameters adaptation to reduce the receiver complexity, when receiver complexity is low or the receiver supports higher complexity, waveform parameters may be adapted to increase the receiver complexity. Although examples are described with respect to certain example parameters to reduce the receiver complexity, any of the waveform parameters described herein and/or other parameters may be adapted to reduce the receiver complexity.

As discussed above, operations in higher bands may lead to increased PAPR. In some examples, the one or more impairments detected by BS 502, at 512, include PAPR. In this example, the one or more waveform parameters to adapt, determined at 514, may be to reduce PAPR. For example, BS 502 may determine, at 514, to adapt the waveform type and/or to use continuous phase modulation (CPM) (e.g. instead of QAM).

Although examples discussed herein relate to reduced PAPR and waveform parameters adaptation to reduce the PAPR, when PAPR is low, waveform parameters may be adapted to increase the PAPR. Although examples are described with respect to certain example parameters to reduce the PAPR, any of the waveform parameters described herein and/or other parameters may be adapted to reduce the PAPR.

At 516, BS 502 signals the adapted waveform parameters to UE 504. BS 502 may signal the adapted waveform parameters via radio resource control (RRC) signaling, medium access control control element (MAC CE) signaling, and/or DCI signaling. In some examples, the signaling indicates a set or group of waveform parameters to adapt. For example, DCI codepoints may correspond to sets of waveform parameters to adapt (e.g., a 2-bit DCI field may be used to indication four different combinations of waveform parameters to adapt).

According to certain aspects, the waveform parameters to adapt may be determined, at 514, and signaled, at 516, for uplink only, for downlink only, for both uplink and downlink, per-channel, per-MIMO, per-beam, per-TCI state, per-subband, per-antenna panel, and/or per-group of antenna panels.

At 518, BS 502 and UE 504 communicate using the adapted waveform parameters. According to certain aspects, a gap may be between the indication of the adapted waveform parameters, at 516, and the actual application of the adapted waveform parameters (e.g., at 518). A length of the gap may be specified in wireless standards, configured, or signaled to UE 504. The length of the gap may be based on UE capability.

According to certain aspects, a PTRS configuration and/or a presence of PTRS may be adapted implicitly based on the adapted waveform parameters. For example, a mapping may be configured (e.g., RRC configured) that maps combinations of waveform parameters to adapt to a particular PTRS configurations. The PTRS configuration implicitly changes if the waveform parameters are adapted.

Example Methods for Waveform Parameters Adaptation

Figure 6:
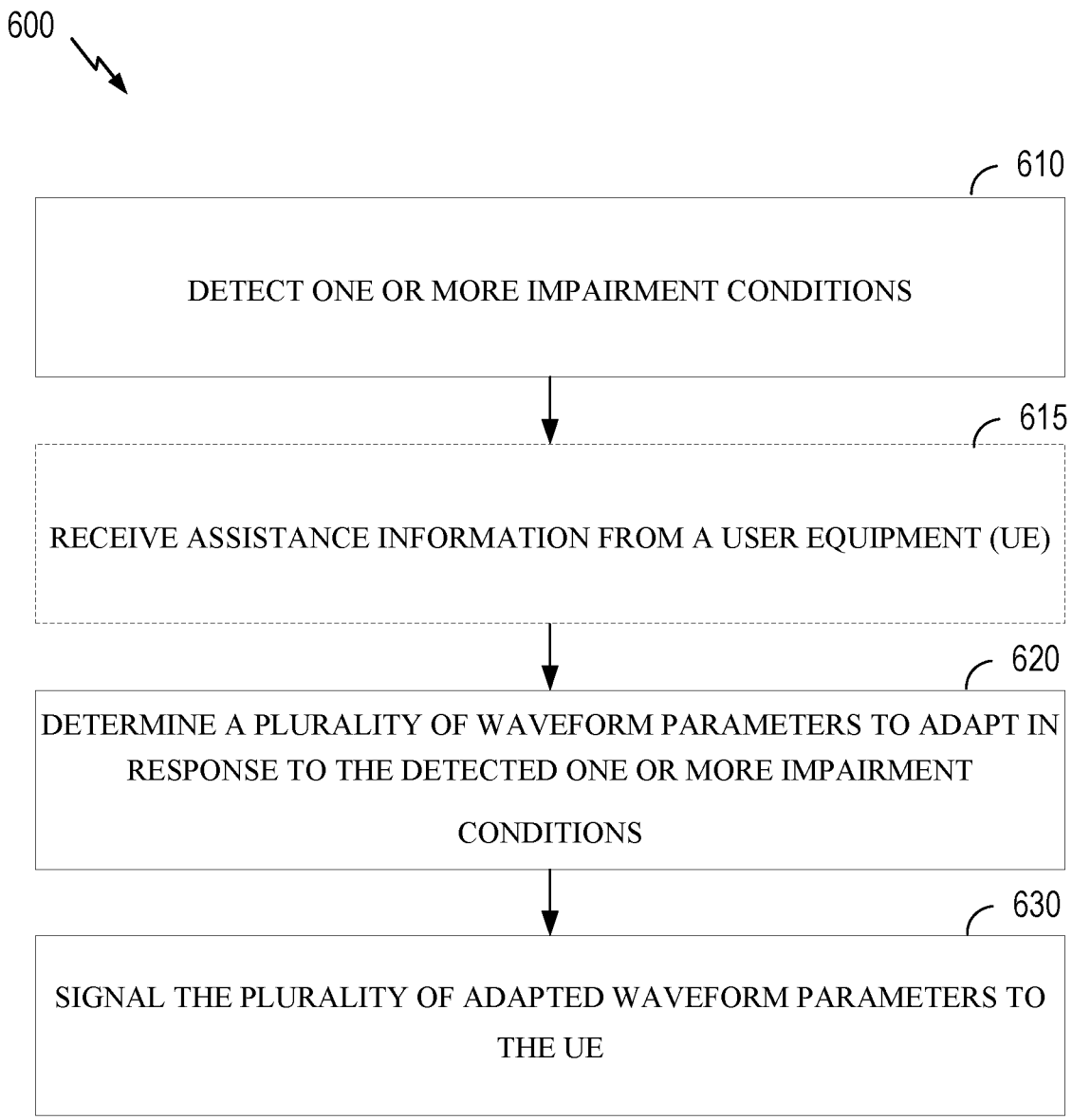
FIG. 6 is a flow diagram illustrating example operations for wireless communication by a BS, in accordance with certain aspects of the present disclosure.

FIG. 6 is a flow diagram illustrating example operations 600 for wireless communication, in accordance with certain aspects of the present disclosure. Operations 600 may be performed, for example, by a base station (BS) (such as a BS 102 in the wireless communication network 100). Operations 600 may be complementary to operations 700 performed by a UE. Operations 600 may be implemented as software components that are executed and run on one or more processors (e.g., controller/processor 240 of FIG. 2). Further, the transmission and reception of signals by the BS in operations 600 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

Operations 600 may begin, at block 610, by detecting one or more impairment conditions. As discussed herein, the one or more impairments conditions may include, but are not limited to, a peak-to-average power ration (PAPR) level, a phase noise level, a signal-to-noise ratio (SNR) level, a block error rate (BLER), a level of receiver UE complexity, or a combination thereof. The one or more impairments may be detected in a high new radio (NR) frequency band. The BS may detect the one or more impairments, at 610, based on measurements by the BS. The BS may detect the one or more impairments based on a combination of measurements by the BS and UE assistance information.

Operations 600 may include, at block 615 receiving assistance information from a UE. The BS may detect the one or more impairments, at 610, based on the assistance information received from the UE. For example, the assistance information may include measurements, loading information at the UE, UE capabilities, and/or one or more waveform parameters requested to adapt.

At block 620, operations 600 include determining a plurality of waveform parameters to adapt in response to the detected one or more impairment conditions. The plurality of waveform parameters may include, but are not limited to, a subcarrier spacing (SCS), a waveform type, a channel equalization technique, a modulation technique, a modulation coding scheme (MCS), a phase noise mitigation technique, a bandwidth size, a phase tracking reference signal (PTRS) configuration, a maximum number of multiple-input multiple-output (MIMO) layers, timing parameters, or a combination thereof.

The BS may determine the plurality of waveform parameters to adapt, at 620, based on the assistance information from the UE, the measurements by the BS, or a combination thereof. The BS may determine the plurality of waveform parameters to adapt based on the one or more impairments. For example, the BS may determine to adapt different pluralities of waveform parameters for different impairments. In some examples, the UE explicitly or implicitly requests the waveform parameters to adapt in the UE assistance information.

At block 630, operations 600 include signaling the plurality of adapted waveform parameters to a UE. The BS may signal the plurality of adapted waveform parameters via radio resource control (RRC), medium access control control element (MAC CE), or downlink control information (DCI) signaling indicating the plurality of adapted waveform parameters. In some examples, the waveform parameters are adapted for uplink, for downlink, per channel, per multiple-input multiple-output (MIMO) layer, per beam, per subband, per transmission configuration indicator (TCI) state, per subband, per UE antenna panel, and/or per group of UE antenna panels.

Figure 7:
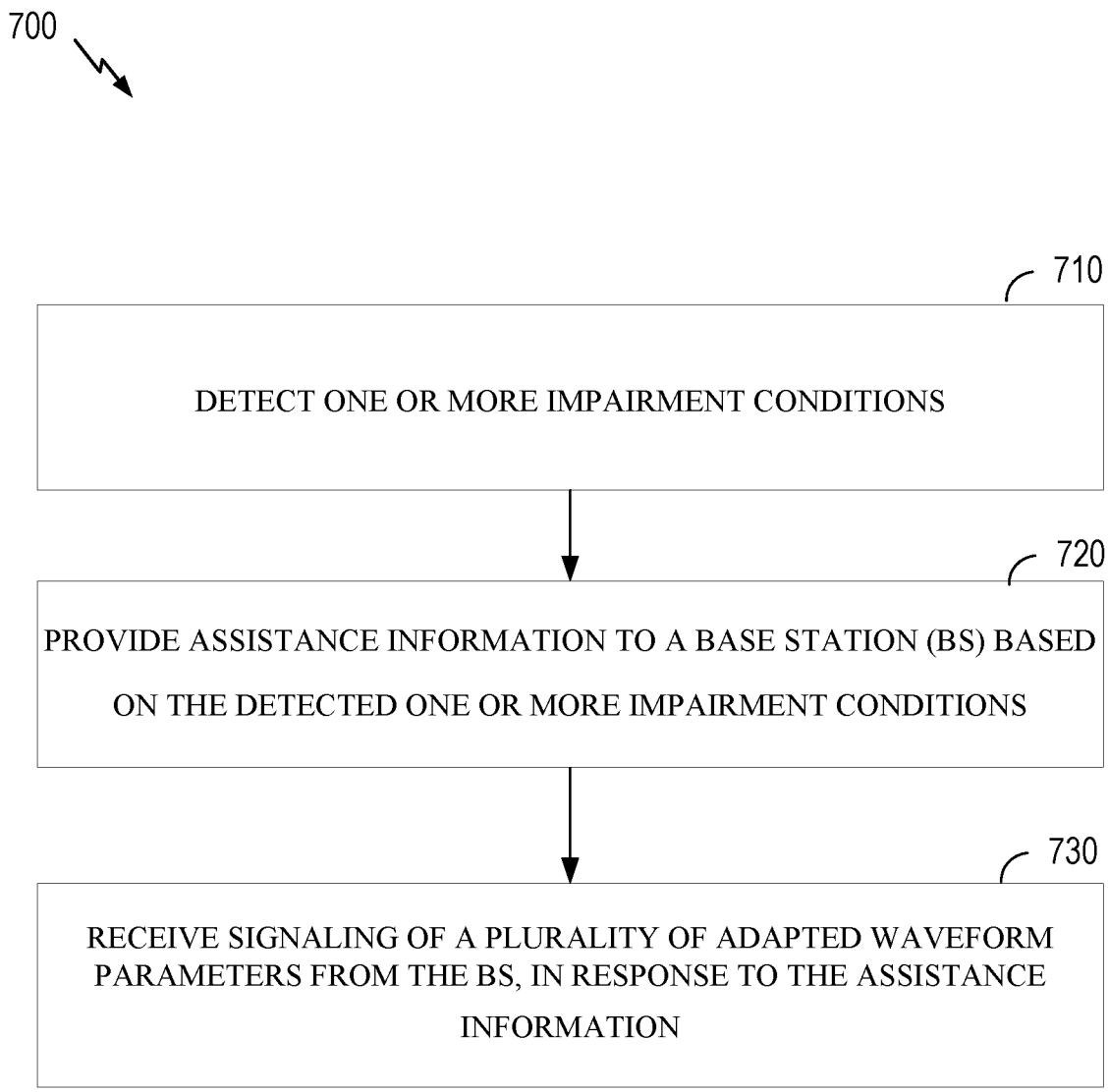
FIG. 7 is a flow diagram illustrating example operations for wireless communication by a UE, in accordance with certain aspects of the present disclosure.

FIG. 7 is a flow diagram illustrating example operations 700 for wireless communication, in accordance with certain aspects of the present disclosure. Operations 700 may be performed, for example, by a UE (such as a UE 104 in the wireless communication network 100). Operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 700 may begin, at block 710, by detecting one or more impairment conditions.

Operations 700 include, at block 720, providing assistance information to a BS based on the detected one or more impairment conditions.

Operations 700 include, at block 730, receiving signaling of a plurality of adapted waveform parameters from the BS, in response to the assistance information.

Example Apparatus for Waveform Parameters Adaptation

Figure 8:
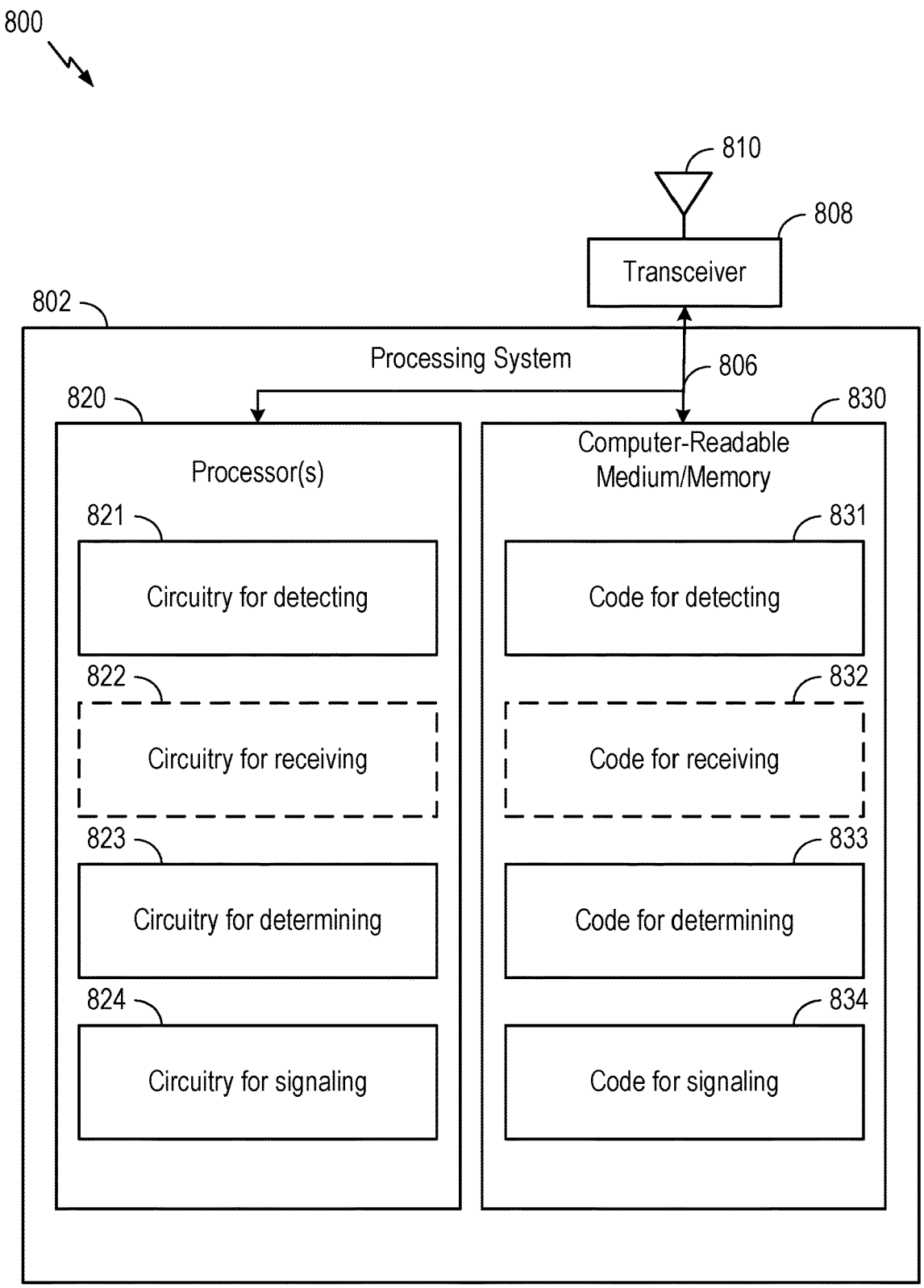
FIG. 8 illustrates an example communications device, in accordance with aspects of the present disclosure.

FIG. 8 illustrates a communications device 800 that may include various components (e.g., corresponding to means-plus-function components) configured to perform operations for the techniques disclosed herein, such as the operations illustrated in FIGS. 5 and/or 6. Communications device 800 includes a processing system 802 coupled to a transceiver 808 (e.g., a transmitter and/or a receiver). Transceiver 808 is configured to transmit and receive signals for communications device 800 via an antenna 810, such as the various signals as described herein. Processing system 802 may be configured to perform processing functions for communications device 800, including processing signals received and/or to be transmitted by communications device 800.

Processing system 802 includes one or more processors 820 coupled to a computer-readable medium/memory 830 via a bus 806. In certain aspects, computer-readable medium/memory 830 is configured to store instructions (e.g., computer-executable code) that when executed by processor(s) 820, cause processor(s) 820 to perform the operations illustrated in FIGS. 5 and/or 6, or other operations for performing the various techniques discussed herein for dynamic waveform parameters adaptation. In certain aspects, computer-readable medium/memory 830 stores code 831 for detecting; code 832 for receiving; code 833 for determining; and/or code 834 for signaling. In certain aspects, the processor(s) 820 has circuitry configured to implement the code stored in computer-readable medium/memory 830. Processor 820 includes circuitry 821 for detecting; circuitry 822 for receiving; circuitry 823 for determining; and/or circuitry 824 for signaling.

Figure 9:
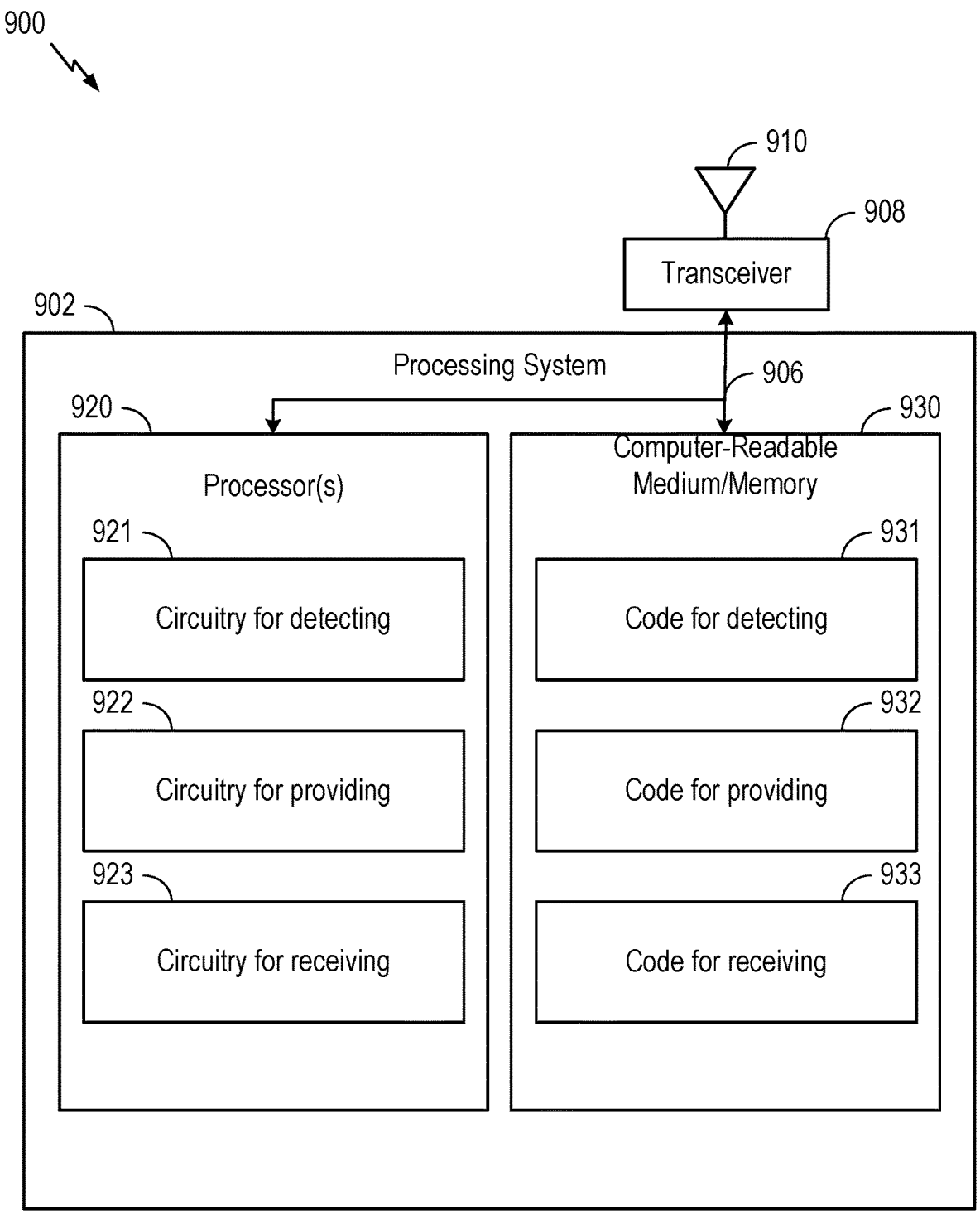
FIG. 9 illustrates an example communications device, in accordance with aspects of the present disclosure.

FIG. 9 illustrates a communications device 900 that may include various components (e.g., corresponding to means-plus-function components) configured to perform operations for the techniques disclosed herein, such as the operations illustrated in FIGS. 5 and/or 7. Communications device 900 includes a processing system 902 coupled to a transceiver 908 (e.g., a transmitter and/or a receiver). Transceiver 908 is configured to transmit and receive signals for communications device 900 via an antenna 910, such as the various signals as described herein. Processing system 902 may be configured to perform processing functions for communications device 900, including processing signals received and/or to be transmitted by communications device 900.

Processing system 902 includes one or more processors 920 coupled to a computer-readable medium/memory 930 via a bus 906. In certain aspects, computer-readable medium/memory 930 is configured to store instructions (e.g., computer-executable code) that when executed by processor(s) 920, cause processor(s) 920 to perform the operations illustrated in FIGS. 5 and/or 7, or other operations for performing the various techniques discussed herein for dynamic waveform parameters adaptation. In certain aspects, computer-readable medium/memory 930 stores code 931 for detecting; code 932 for receiving; code 933 for determining; and/or code 934 for signaling. In certain aspects, the processor(s) 920 has circuitry configured to implement the code stored in computer-readable medium/memory 930. Processor 920 includes circuitry 921 for detecting; circuitry 922 for receiving; circuitry 923 for determining; and/or circuitry 924 for signaling.

Aspects of the present disclosure provide for dynamic adaptation of combinations of waveform parameters that may be adapted to address various impairments conditions, that may occur in high band 5G operation.

EXAMPLE ASPECTS

In addition to the various aspects described above, the aspects can be combined. Some specific combinations of aspects are detailed below:

Aspect 1. A method for wireless communication by a base station (BS), comprising: detecting one or more impairment conditions; determining a plurality of waveform parameters to adapt in response to the detected one or more impairment conditions; and signaling the plurality of adapted waveform parameters to a user equipment (UE).

Aspect 2. The method of aspect 1, wherein the one or more impairment conditions comprises one or more of: a peak-to-average power ration (PAPR) level, a phase noise level, a signal-to-noise ratio (SNR) level, a block error rate (BLER), a level of receiver complexity at the UE, or a combination thereof.

Aspect 3. The method of aspect 2, wherein the plurality of waveform parameters comprises two or more of: a subcarrier spacing (SCS), a waveform type, a channel equalization technique, a modulation technique, a modulation coding scheme (MCS), a phase noise mitigation technique, a bandwidth size, a phase tracking reference signal (PTRS) configuration, a maximum number of multiple-input multiple-output (MIMO) layers, timing parameters, or a combination thereof.

Aspect 4. The method of aspect 3, wherein determining the plurality of waveform parameters to adapt includes determining two or more of: of an increased SCS, a wider bandwidth, a single carrier waveform, a simpler phase noise mitigation technique, a non-coherent modulation technique, a reduced MCS, a filter technique, or a particular PTRS configuration, and wherein the plurality of waveform parameters are determined based, at least in part, on the phase noise level.

5. The method of any one or more of aspects 3-4, wherein determining the plurality of waveform parameters to adapt includes determining two or more of: a different waveform type, a time domain equalization (TDE) technique, a lower SCS, a lower maximum number of MIMO layers, a smaller bandwidth size, or relaxed timing parameters, and wherein the plurality of waveform parameters are determined based, at least in part, on the receiver complexity at the UE.

Aspect 6. The method of any one or more of aspects 3-5, wherein determining the plurality of waveform parameters to adapt includes determining a different waveform type and a continuous phase modulation (CPM) technique to reduce the PAPR.

Aspect 7. The method of any one or more of aspects 1-6, wherein the signaling the plurality of adapted waveform parameters to the UE comprises radio resource control (RRC) signaling, a medium access control (MAC) control element (CE), or downlink control information (DCI), wherein the RRC signaling, the MAC CE, or the DCI indicates the plurality of adapted waveform parameters.

Aspect 8. The method of aspect 7, wherein the signaling indicates a codepoint of a plurality of configured codepoints, and wherein each codepoint maps to a different combination of waveform parameters to adapt.

Aspect 9. The method of any one or more of aspects 1-8, wherein determining the plurality of waveform parameters to adapt is based on one or more UE capabilities, one or more channel conditions measured by the BS, one or more channel conditions estimated by the BS, one or more measurements reported by the UE, UE assistance information, or a combination thereof.

Aspect 10. The method of aspect 9, wherein the UE assistance information comprises loading information of the UE.

Aspect 11. The method of any one or more of aspects 9-10, wherein the UE assistance information comprises a request to adapt one or more waveform parameters.

Aspect 12. The method of aspect 11, wherein the request to adapt the one or more waveform parameters is an explicit indication received standalone or multiplexed in a physical uplink control channel (PUCCH) or a physical uplink shared channel (PDSCH).

Aspect 13. The method of any one or more of aspects 11-12, further comprising signaling one or more metrics, one or more thresholds, or a combination thereof to the UE for requesting waveform parameters to adapt.

Aspect 14. The method of any one or more of aspects 11-13, wherein the request to adapt the one or more waveform parameters is an implicit indication.

Aspect 15. The method of any one or more of aspects 11-14, wherein the request to adapt the one or more waveform parameters is indicated for uplink, for downlink, per channel, per multiple-input multiple-output (MIMO) layer, per beam, per subband, per transmission configuration indicator (TCI) state, per subband, per UE antenna panel, per group of UE antenna panels, or a combination thereof.

Aspect 16. The method of any one or more of aspects 11-15, wherein the UE assistance information is received periodically, aperiodically, triggered by the BS, event-based, or a combination thereof.

Aspect 17. The method of any one or more of aspects 11-16, wherein the UE assistance information comprises a channel quality indicator (CQI) mapping to a requested modulation scheme.

Aspect 18. The method of aspect 17, wherein the UE assistance information comprises an index to a table mapping to the CQI and the requested modulation scheme.

Aspect 19. The method of any one or more of aspects 11-18, wherein the UE assistance information comprises a request modulation scheme implicitly indicating a request phase tracking reference signal (PTRS) configuration.

Aspect 20. The method of any one or more of aspects 1-19, wherein a time gap between signaling of the plurality of waveform parameters to adapt and use of the adapted waveform parameters is configured, specified, or signaled.

Aspect 21. The method of any one or more of aspects 1-20, wherein the plurality of adapted waveform parameters are signaled for uplink, for downlink, per channel, per multiple-input multiple-output (MIMO) layer, per beam, per subband, per transmission configuration indicator (TCI) state, per subband, per UE antenna panel, per group of UE antenna panels, or a combination thereof.

Aspect 22. The method of any one or more of aspects 1-21, further comprising: signaling the UE to preconfigure a mapping of semi-static phase tracking reference signal (PTRS) configurations to phase noise levels; and using one of the PTRS configurations based on a current phase noise level.

Aspect 23. A method for wireless communications by a user equipment (UE), comprising: detecting one or more impairment conditions; providing assistance information to a base station (BS) based on the detected one or more impairment conditions; and receiving signaling of a plurality of adapted waveform parameters from the BS, in response to the assistance information.

Aspect 24. The method of aspect 23, wherein the one or more impairment conditions comprises one or more of: a peak-to-average power ration (PAPR) level, a phase noise level, a signal-to-noise ratio (SNR) level, a block error rate (BLER), a level of receiver complexity at the UE, or a combination thereof.

Aspect 25. The method of aspect 24, wherein the plurality of adapted waveform parameters comprises two or more of: a subcarrier spacing (SCS), a waveform type, a channel equalization technique, a modulation technique, a modulation coding scheme (MCS), a phase noise mitigation technique, a bandwidth size, a phase tracking reference signal (PTRS) configuration, a maximum number of multiple-input multiple-output (MIMO) layers, timing parameters, or a combination thereof.

Aspect 26. The method of aspect 25, wherein the plurality of adapted waveform parameters includes two or more of: of an increased SCS, a wider bandwidth, a single carrier waveform, a simpler phase noise mitigation technique, a non-coherent modulation technique, a reduced MCS, a filter technique, or a particular PTRS configuration, and wherein the plurality of waveform parameters are determined based, at least in part, on the phase noise level.

Aspect 27. The method of aspect 26, wherein the plurality of adapted waveform parameters includes two or more of: a different waveform type, a time domain equalization (TDE) technique, a lower SCS, a lower maximum number of MIMO layers, a smaller bandwidth size, or relaxed timing parameters, and wherein the plurality of waveform parameters are determined based, at least in part, on the receiver complexity at the UE.

Aspect 28. The method of any one or more of aspects 26-27, wherein the plurality of adapted waveform parameters includes a different waveform type and a continuous phase modulation (CPM) technique to reduce the PAPR.

Aspect 29. The method of any one or more of aspects 23-29, wherein the signaling of the plurality of adapted waveform parameters comprises radio resource control (RRC), a medium access control (MAC) control element (CE), or downlink control information (DCI), and wherein the RRC signaling, the MAC CE or the DCI indicates the plurality of adapted waveform parameters.

Aspect 30. The method of aspect 29, wherein the signaling indicates a codepoint of a plurality of configured codepoints, and wherein each codepoint maps to a different combination of waveform parameters to adapt.

Aspect 31. The method of any one or more of aspects 23-30, wherein a time gap between the signaling of the plurality of adapted waveform parameters and use of the adapted waveform parameters is configured, specified, or signaled.

Aspect 32. The method of any one or more of aspects 23-31, wherein the plurality of adapted waveform parameters are signaled for uplink, for downlink, per channel, per multiple-input multiple-output (MIMO) layer, per beam, per subband, per transmission configuration indicator (TCI) state, per subband, per UE antenna panel, per group of UE antenna panels, or a combination thereof.

Aspect 33. The method of any one or more of aspects 23-32, wherein the assistance information is signaled for uplink, for downlink, per channel, per multiple-input multiple-output (MIMO) layer, per beam, per subband, per transmission configuration indicator (TCI) state, per subband, per UE antenna panel, per group of UE antenna panels, or a combination thereof.

Aspect 34. The method of any one or more of aspects 23-33, further comprising: receiving signaling from the BS preconfiguring a mapping of semi-static phase tracking reference signal (PTRS) configurations to phase noise levels; and using one of the PTRS configurations based on a current phase noise level.

Aspect 35. The method of any one or more of aspects 23-34, wherein the assistance information includes one or more UE capabilities, one or more channel conditions measured by the UE, parameters, or a combination thereof.

Aspect 36. The method of any one or more of aspects 23-35, wherein the assistance information comprises loading information.

Aspect 37. The method of any one or more of aspects 23-36, wherein the assistance information includes a request to adapt one or more waveform parameters.

Aspect 38. The method of aspect 37, wherein the request to adapt the one or more waveform parameters is an explicit indication provided standalone or multiplexed in a physical uplink control channel (PUCCH) or a physical uplink shared channel (PDSCH).

Aspect 39. The method of any one or more of aspects 37-38, further comprising receiving signaling from the BS of one or more metrics, one or more thresholds, or a combination thereof to the UE for requesting waveform parameters to adapt.

Aspect 40. The method of any one or more of aspects 37-39, wherein the request to adapt the one or more waveform parameters is an implicit indication.

Aspect 41. The method of aspect 40, wherein the assistance information comprises a channel quality indicator (CQI) mapping to a requested modulation scheme.

Aspect 42. The method of aspect 41, wherein the assistance information comprises an index to a table mapping to the CQI and the requested modulation scheme.

Aspect 43. The method of any one or more of aspects 40-42, wherein the assistance information comprises a requested modulation scheme implicitly indicating a requested phase tracking reference signal (PTRS) configuration.

Aspect 44. The method of any one or more of aspects 23-43, wherein the assistance information is provided periodically, aperiodically, triggered by the BS, event-based, or a combination thereof.

Aspect 45. An apparatus comprising means for performing the method of any of aspects 1 through 44.

Aspect 46. An apparatus comprising at least one processor and a memory coupled to the at least one processor, the memory comprising code executable by the at least one processor to cause the apparatus to perform the method of any of aspects 1 through 44.

Aspect 47. A computer readable medium storing computer executable code thereon for wireless communications that, when executed by at least one processor, cause an apparatus to perform the method of any of aspects 1 through 44.

Additional Wireless Communication Network Aspects

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements. In addition, these service may co-exist in the same subframe.

Returning to FIG. 1, various aspects of the present disclosure may be performed within the example wireless communication network 100.

In 3GPP, the term "cell" can refer to a coverage area of a Node B (NB) and/or a NB subsystem serving this coverage area, depending on the context in which the term is used. A macro cell may generally cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS or a home BS.

BS 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with core network 190 through second backhaul links 184. BSs 102 may communicate directly or indirectly (e.g., through the EPC 160 or core network 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some BSs, such as BS 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the BS 180 may be referred to as an mmWave BS.

The communication links 120 between BSs 102 and, for example, UEs 104, may be through one or more carriers. For example, BSs 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers (CCs) may include a primary component carrier (PCC) and one or more secondary component carriers (SCCs). A PCC may be referred to as a primary cell (PCell) and a SCC may be referred to as a secondary cell (SCell).

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

Core network 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and core network 190. Generally, AMF 192 provides QoS flow and session management.

All user Internet protocol (IP) packets are transferred through UPF 195, which is connected to the IP Services 197, and which provides UE IP address allocation as well as other functions for core network 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the PUSCH) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be TDD, in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI).

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology there are 14 symbols/slot and $2\mu$ slots/subframe. The subcarrier spacing (SCS) and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of waveform parameters adaptation in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project"

(3GPP). cdma2000 and UMB are described in documents from an organization named "3rd Generation Partnership Project 2" (3GPP2). NR is an emerging wireless communications technology under development.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 5-7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above.

The invention claimed is:

1. An apparatus for wireless communication, comprising:
at least one processor; and
a memory coupled to the at least one processor, the memory comprising code executable by the at least one processor to cause the apparatus to:
detect one or more impairment conditions; and
determine a plurality of waveform parameters to adapt in response to the one or more impairment conditions, wherein the plurality of waveform parameters comprises two or more of: a subcarrier spacing (SCS), a waveform type, a channel equalization technique, a modulation technique, a modulation coding scheme (MCS), a phase noise mitigation technique, a bandwidth size, a phase tracking reference signal (PTRS) configuration, a maximum number of multiple-input multiple-output (MIMO) layers, or timing parameters; and
a transmitter configured to signal the plurality of adapted waveform parameters to a user equipment (UE).

2. The apparatus of claim 1, wherein the one or more impairment conditions comprises one or more of: a peak-to-average power ration (PAPR) level, a phase noise level, a signal-to-noise ratio (SNR) level, a block error rate (BLER), a level of receiver complexity at the UE, or a combination thereof.

3. The apparatus of claim 1, wherein the code executable by the at least one processor to cause the apparatus to determine the plurality of waveform parameters to adapt comprises code executable by the at least one processor to cause the apparatus to determine two or more of: an increased SCS, a wider bandwidth, a single carrier waveform, a simpler phase noise mitigation technique, a non-coherent modulation technique, a reduced MCS, a filter technique, or a particular PTRS configuration, and wherein the plurality of waveform parameters are determined based, at least in part, on a phase noise level.

4. The apparatus of claim 1, wherein the code executable by the at least one processor to cause the apparatus to determine the plurality of waveform parameters to adapt comprises code executable by the at least one processor to cause the apparatus to determine two or more of: a different waveform type, a time domain equalization (TDE) technique, a lower SCS, a lower maximum number of MIMO layers, a smaller bandwidth size, or relaxed timing parameters, and wherein the plurality of waveform parameters are determined based, at least in part, on a level of receiver complexity at the UE.

5. The apparatus of claim 1, wherein the code executable by the at least one processor to cause the apparatus to determine the plurality of waveform parameters to adapt comprises code executable by the at least one processor to cause the apparatus to determine a different waveform type and a continuous phase modulation (CPM) technique, and wherein the plurality of waveform parameters are determined based, at least in part, on a PAPR level.

6. The apparatus of claim 1, wherein the transmitter being configured to signal the plurality of adapted waveform parameters comprises the transmitter being configured to send radio resource control (RRC) signaling, a medium access control (MAC) control element (CE), or downlink control information (DCI), and wherein the RRC signaling, MAC CE, or DCI indicates the plurality of adapted waveform parameters.

7. The apparatus of claim 6, wherein the RRC signaling, the MAC CE, or the DCI indicates a codepoint of a plurality of configured codepoints, and wherein each codepoint maps to a different combination of waveform parameters to adapt.

8. The apparatus of claim 1, wherein the code executable by the at least one processor to cause the apparatus to determine the plurality of waveform parameters to adapt comprises code executable by the at least one processor to cause the apparatus to determine the plurality of waveforms to adapt based on one or more UE capabilities, one or more channel conditions measured by the apparatus, one or more channel conditions estimated by the apparatus, one or more measurements reported by the UE, assistance information received from the UE, or a combination thereof.

9. The apparatus of claim 8, further comprising a receiver configured to receive the assistance information, wherein the assistance information comprises loading information of the UE.

10. The apparatus of claim 8, further comprising a receiver configured to receive the assistance information, wherein the assistance information comprises a request to adapt one or more waveform parameters.

11. The apparatus of claim 10, wherein the request to adapt the one or more waveform parameters is an explicit indication received standalone or multiplexed in a physical uplink control channel (PUCCH) or a physical uplink shared channel (PUSCH).

12. The apparatus of claim 10, wherein the transmitter is further configured to signal one or more metrics, one or more thresholds, or a combination thereof to the UE for requesting waveform parameters to adapt.

13. The apparatus of claim 10, wherein the request to adapt the one or more waveform parameters is an implicit indication.

14. The apparatus of claim 10, wherein the request to adapt the one or more waveform parameters is indicated for uplink, for downlink, per channel, per MIMO layer, per beam, per subband, per transmission configuration indicator (TCI) state, per subband, per UE antenna panel, per group of UE antenna panels, or a combination thereof.

15. The apparatus of claim 8, wherein the assistance information is received periodically, aperiodically, triggered by the apparatus, event-based, or a combination thereof.

16. The apparatus of claim 8, wherein the assistance information comprises a channel quality indicator (CQI) mapping to a requested modulation scheme.

17. The apparatus of claim 16, wherein the assistance information comprises an index to a table mapping to the CQI and the requested modulation scheme.

18. The apparatus of claim 8, wherein the assistance information comprises a request modulation scheme implicitly indicating a requested PTRS configuration.

19. The apparatus of claim 1, wherein a time gap between signaling of the plurality of waveform parameters to adapt and use of the adapted waveform parameters is configured, specified, or signaled.

20. The apparatus of claim 1, wherein the plurality of adapted waveform parameters are signaled for uplink, for downlink, per channel, per MIMO layer, per beam, per subband, per transmission configuration indicator (TCI) state, per subband, per UE antenna panel, per group of UE antenna panels, or a combination thereof.

21. The apparatus of claim 1, wherein:
the transmitter is further configured to signal the UE to preconfigure a mapping of semi-static PTRS configurations to phase noise levels; and
the at least one processor is further configured to use one of the semi-static PTRS configurations based on a current phase noise level.

22. A method for wireless communications by a base station (BS), comprising:
detecting one or more impairment conditions;
determining a plurality of waveform parameters to adapt in response to the detected one or more impairment conditions, wherein the plurality of waveform parameters comprises two or more of: a subcarrier spacing (SCS), a waveform type, a channel equalization technique, a modulation technique, a modulation coding scheme (MCS), a phase noise mitigation technique, a bandwidth size, a phase tracking reference signal (PTRS) configuration, a maximum number of multiple-input multiple-output (MIMO) layers, or timing parameters; and
signaling the plurality of adapted waveform parameters to a user equipment (UE).

23. The method of claim 22, wherein the one or more impairment conditions comprises one or more of: a peak-to-average power ration (PAPR) level, a phase noise level, a signal-to-noise ratio (SNR) level, a block error rate (BLER), a level of receiver complexity at the UE, or a combination thereof.

24. The method of claim 22, wherein determining the plurality of waveform parameters to adapt comprises determining two or more of: an increased SCS, a wider bandwidth, a single carrier waveform, a simpler phase noise mitigation technique, a non-coherent modulation technique, a reduced MCS, a filter technique, or a particular PTRS configuration, and wherein the plurality of waveform parameters are determined based, at least in part, on a phase noise level.

25. The method of claim 22, wherein determining the plurality of waveform parameters to adapt comprises determining two or more of: a different waveform type, a time domain equalization (TDE) technique, a lower SCS, a lower maximum number of MIMO layers, a smaller bandwidth size, or relaxed timing parameters, and wherein the plurality of waveform parameters are determined based, at least in part, on a level of receiver complexity at the UE.

26. The method of claim 22, wherein determining the plurality of waveform parameters to adapt comprises determining a different waveform type and a continuous phase modulation (CPM) technique, and wherein the plurality of waveform parameters are determined based, at least in part, on a PAPR level.

27. An apparatus for wireless communication, comprising:
means for detecting one or more impairment conditions;
means for determining a plurality of waveform parameters to adapt in response to the detected one or more impairment conditions, wherein the plurality of waveform parameters comprises two or more of: a subcarrier spacing (SCS), a waveform type, a channel equalization technique, a modulation technique, a modulation coding scheme (MCS), a phase noise mitigation technique, a bandwidth size, a phase tracking reference signal (PTRS) configuration, a maximum number of multiple-input multiple-output (MIMO) layers, or timing parameters; and
means for signaling the plurality of adapted waveform parameters to a user equipment (UE).

28. A non-transitory computer readable medium comprising computer executable that, when executed by at least one processor, cause a base station (BS) to:
detect one or more impairment conditions;
determine a plurality of waveform parameters to adapt in response to the detected one or more impairment conditions, wherein the plurality of waveform parameters comprises two or more of: a subcarrier spacing (SCS), a waveform type, a channel equalization technique, a modulation technique, a modulation coding scheme (MCS), a phase noise mitigation technique, a bandwidth size, a phase tracking reference signal (PTRS) configuration, a maximum number of multiple-input multiple-output (MIMO) layers, or timing parameters; and signal the plurality of adapted waveform parameters to a user equipment (UE).

\* \* \* \* \*